Patented Oct. 24, 1922.

1,433,124

UNITED STATES PATENT OFFICE.

JUDSON A. DE CEW, OF NEW YORK, N. Y., ASSIGNOR TO PROCESS ENGINEERS, INCORPORATED, OF NEW YORK, N. Y., A CORPORATION OF NEW YORK.

ROSIN MATERIAL FOR SIZING.

No Drawing. Application filed September 28, 1920. Serial No. 413,365.

*To all whom it may concern:*

Be it known that I, JUDSON A. DE CEW, a citizen of the Dominion of Canada, residing at 501 Fifth Avenue, New York, N. Y., have invented certain new and useful Improvements in Rosin Materials for Sizing, of which the following is a specification.

This invention relates to a method of improving the properties of rosin or resin materials in order to increase the strength and elasticity and more specially, to make the product more suitable for the purpose of sizing paper.

In my Patent No. 1,203,857, I disclose a method of incorporating 1% of rubber into a resinous product by dissolving the rubber directly into the molten rosin. I have since discovered that a more suitable method of combining a rubber product such as rubber or gutta-percha with molten rosin with less injury to the rubber product is to bring them together in the presence of a suitable solvent such as gasoline, benzol, turpentine or the like.

After the removal of the solvent by distillation, the rubber product will remain dissolved in the rosin. The effect upon the rosin is to increase its strength and elasticity also to increase the colloidal properties of its hydrates. The product however, is more difficult to saponify and also it is more difficult to emulsify in water without decomposition of the emulsion.

The amount of rubber product that can be taken up by the resin while still retaining emulsifying properties so that the product can still be used for sizing paper by the emulsifying process, will depend partly upon the method of incorporation and temperatures used and partly upon the character and quality of the rubber product employed.

The maximum quantity that can be used as far as yet discovered, will be approximately 5% of the weight of the rosin when using a high grade of rubber. This does not apply to the use of low grade rubbers containing large quantities of rubber resins.

What I claim is:

1. A method of producing a rosin having superior properties which consists in incorporating a rubber product and rosin into a solvent and finally removing the solvent by distillation.

2. A method of improving the quality of rosin which consists in incorporating a rubber product into the turpentine pitch and then distilling off the oil of turpentine.

3. An unsaponified rosin product containing approximately 5% of a rubber product.

In testimony whereof I have affixed my signature to this specification.

JUDSON A. DE CEW.